US006985350B2

(12) United States Patent
Hennings et al.

(10) Patent No.: US 6,985,350 B2
(45) Date of Patent: Jan. 10, 2006

(54) DIELECTRIC COMPOSITION ON THE BASIS OF BARIUM TITANATE

(75) Inventors: Detley Hennings, Detlef (DE); Baby Seriyati Schreinemacher, Eynatten (BE); Uwe Mackens, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/515,082

(22) PCT Filed: May 19, 2003

(86) PCT No.: PCT/IB03/01914

§ 371 (c)(1),
(2), (4) Date: Nov. 18, 2004

(87) PCT Pub. No.: WO03/100793

PCT Pub. Date: Dec. 4, 2003

(65) Prior Publication Data

US 2005/0162809 A1    Jul. 28, 2005

(30) Foreign Application Priority Data

May 23, 2002   (DE) ................................ 102 22 746

(51) Int. Cl.
*H01G 4/06* (2006.01)
(52) U.S. Cl. .............................. 361/321.2; 361/321.5; 361/311; 29/25.41; 501/135; 501/136
(58) Field of Classification Search ............... 361/311, 361/312, 313, 321.1, 321.2, 321.3, 321.4, 361/321.5, 322; 510/134–139; 29/25.41, 29/25.42
See application file for complete search history.

(56) References Cited

U.S. PATENT DOCUMENTS

| 4,283,753 | A |   | 8/1981 | Burn ........................... 361/321 |
| 4,598,055 | A | * | 7/1986 | Hennings et al. ............ 501/137 |
| 5,198,269 | A | * | 3/1993 | Swartz et al. ................ 427/226 |
| 6,593,263 | B2 | * | 7/2003 | Nahm et al. ................. 501/135 |
| 6,720,280 | B2 | * | 4/2004 | Yamagiwa et al. ......... 501/134 |

\* cited by examiner

*Primary Examiner*—Anthony Dinkins

(57) ABSTRACT

The invention relates to the dielectric composition on the basis of barium titanate ($BaTiO_3$) that is present with $Ba(Zn_{1/3}Nb_{2/3})O_3$ in a perovslite structure, which dielectric composition exhibits an average grain size $d_{50}$ in the range of 0.2 μm to 0.5 μm and a crystallite size $d_{10}$ below 0.3 μm.

15 Claims, 2 Drawing Sheets

DIELECTRIC COMPOSITION ON THE BASIS OF BARIUM TITANATE

Figure 1:
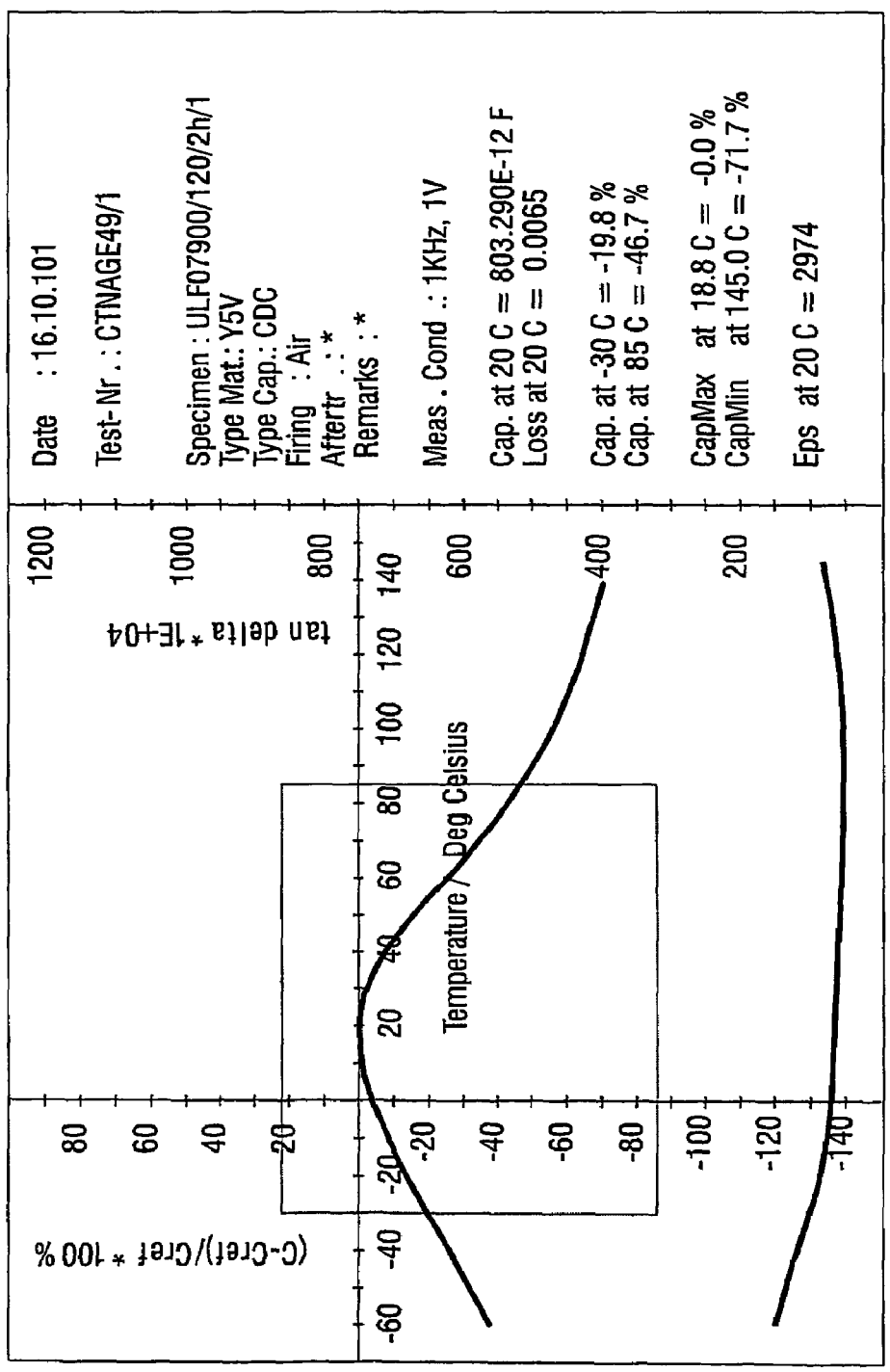

The invention relates to a dielectric composition on the basis of barium titanate ($BaTiO_3$) that is present with $Ba(Zn_{1/3}Nb_{2/3})O_3$ in a perovskite structure.

Dielectric compositions on the basis of barium titanate constitute an important starting material for components used in electronics and telecommunications. They are used to make passive electronic components, such as capacitors. For this purpose, the dielectric compositions must exhibit a high dielectric constant K at ambient temperature of 2,000 or more, values in excess of 5,000 being attainable.

An important technology for the manufacture of microelectronic substrates having a high packing density is the so-termed "Low Temperature Cofired Ceramics" technology, hereinafter referred to as LTCC technology. In accordance with said technology, insulating ceramic foils that customarily also contain apertures for the vertical connections are printed with metal line patterns, after which the laminated foils are fired at temperatures in the range between 850° C. and 900° C. If known dielectric compositions are used, however, the firing or sintering temperature must be increased considerably in order to ensure that the sintering process is completed in a satisfactory manner.

U.S. Pat. No. 4,283,753 discloses a dielectric composition having a high dielectric constant that is aimed to be sinterable at low temperatures. By specific monitoring of the stoichiometry and the charge equalization it is achieved to provide a dielectric composition on the basis of barium titanate which can be sintered at temperatures of approximately 1100° C. This comparatively low sintering temperature enables conductor tracks to be used which are composed of a palladium-silver alloy comprising at least 30% by weight silver.

Particularly for high-frequency applications in the radio communication technology, the metallic conductor tracks in modules produced in accordance with the LTCC technology must be composed of a highly conductive metal, preferably pure silver. Due to silver's low melting point of 961° C., the sintering temperature of the ceramic masses should, where possible, not exceed a value of 920° C. In addition, it is important for the ceramic masses to exhibit similar coefficients of thermal expansion τ.

It is an object of the invention to provide a dielectric composition of the type mentioned in the opening paragraph, which enables the sintering temperatures to be so low that pure silver can be used as the material for the metallic conductor tracks.

For a dielectric composition on the basis of barium titanate that is present with $Ba(Zn_{1/3}Nb_{2/3})O_3$ in a perovskite structure, this object is achieved in that said dielectric composition has an average grain size $d_{50}$ in the range of 0.2 μm to 0.5 μm and a crystallite size $d_{10}$ below 0.3 μm. Preferably, the average grain size $d_{50}$ lies in the range of 0.3 μm to 0.4 μm, and the crystallite size $d_{10}$ is below or equal to 0.2 μm. It has surprisingly been found that the grain size and the crystallite size of the base material used is of decisive importance for the reduction of the sintering temperature to below 920° C.

To additionally modify the coefficient of expansion τ of the dielectric composition, in a preferred embodiment, sintering additives are used that required an inventive choice to be made since the sintering additives that are customarily used lead to a dramatic reduction of the dielectric constant. Said sintering additives also enable the sintering temperature to be further modified.

The sintering additives that can suitably be used for the dielectric composition are oxide mixtures comprising at least zinc oxide (ZnO), boron oxide ($B_2O_3$), silicon oxide ($SiO_2$) and copper oxide (CuO). The preferred content of copper oxide, with respect to the quantity of $BaTiO_3$—$Ba(Zn_{1/3}Nb_{2/3})O_3$ mixed crystal, lies in the range of 0.25 wt. % to 1.5 wt. %.

It is further preferred that the dielectric composition comprises zinc oxide and boron oxide as boralite ($Zn_4B_6O_{13}$). Boralite may have been added in a quantity of 1 wt. % to 5 wt. % with respect to the quantity of $BaTiO_3$—$Ba(Zn_{1/3}Nb_{2/3})O_3$ mixed crystal.

In accordance with an equally preferred embodiment, the sintering additive and hence the dielectric composition comprises titanium oxide ($TiO_2$) and lithium carbonate ($Li_2CO_3$). In such a mixture, lithium carbonate and silicon oxide may have been pre-reacted to form silicon silicate ($Li_2SiO_3$). Said lithium silicate may be present in a quantity of 0.5 wt. % to 2.5 wt. % with respect to the quantity of $BaTiO_3$—$Ba(Zn_{1/3}Nb_{2/3})O_3$ mixed crystal.

Zinc oxide, silicon oxide and titanium oxide may have been pre-reacted to form ZST ($ZnSiTiO_5$); ZST may be present in a quantity of 1 wt. % to 5 wt. % with respect to the quantity of $BaTiO_3$—$Ba(Zn_{1/3}Nb_{2/3})O_3$ mixed crystal.

To increase the insulation resistance IR and the service life, preferably small quantities of manganese (Mn) are added to the mixed crystal, as a result of which a base material $Ba(Ti_{1-x-y}Mn_y[Zn_{1/3}Nb_{2/3}]_x)O_3$ is obtained, wherein $0.03 \leq x \leq 0.1$ and $0.001 \leq y \leq 0.01$.

A method of manufacturing a $BaTiO_3$—$Ba(Zn_{1/3}Nb_{2/3})O_3$ mixed crystal for a dielectric composition as described above comprises the following steps:

providing starting materials for barium, zinc, titanium, niobium and, if necessary, manganese in pulverized form;

mixing the appropriate molar quantities of the starting materials in an aqueous suspension;

drying the suspension and deaggregating the dried mixture to a powder;

calcining the powder;

grinding the calcined powder to a grain size $d_{50}$ in the range of 0.2 μm to 0.5 μm so that the crystallite size $d_{10}$ is smaller than 0.3 μm.

"In pulverized form" is to be taken to mean herein that the starting materials, in so far as they are solids, have been pulverized to grain sizes below 0.5 μm or are available in dissolved form or as colloids or the like.

A method of manufacturing a dielectric composition that is compatible, in respect of sintering temperature and thermal coefficients of expansion, with commercially available glass ceramic layers comprises the following steps:

providing a powder of $BaTiO_3$—$Ba(Zn_{1/3}Nb_{2/3})O_3$-mixed crystal, if necessary doped with manganese, having an average grain size $d_{50}$ in the range of 0.2 μm to 0.5 μm, preferably in the range of 0.3 μm to 0.4 μm, and a crystallite size $d_{10}$ below 0.3 μm, preferably below or equal to 0.2 μm;

providing a sintering additive having an average grain size $d_{50} < 0.5$ μm, which is selected from:

a) a mixture of zinc oxide, boron oxide, silicon oxide and copper oxide, a1) a mixture of boralite silicon oxide and copper oxide, b) a mixture of zinc oxide, boron oxide, silicon oxide, copper oxide, titanium oxide and lithium carbonate, or b1) a mixture of boralite ZST, lithium silicate and copper oxide, in a quantity of 1.5 wt. % to 15 wt. % with respect to the quantity of $BaTiO_3$—$Ba(Zn_{1/3}Nb_{2/3})O_3$ mixed crystal;

mixing $BaTiO_3$—$Ba(Zn_{1/3}Nb_{2/3})O_3$ mixed crystal with the selected sintering additive, making sure that the average grain size is maintained.

By means of the dielectric composition in accordance with the invention, it is possible to manufacture a sintered laminated component comprising at least two layers of a glass ceramic between which a dielectric composition in accordance with the invention is arranged, and comprising integrated electrodes of silver (Ag) or a silver-containing alloy.

These and other aspects of the invention are apparent from and will be elucidated with reference to the embodiments described hereinafter.

In the drawings

Figure 2:
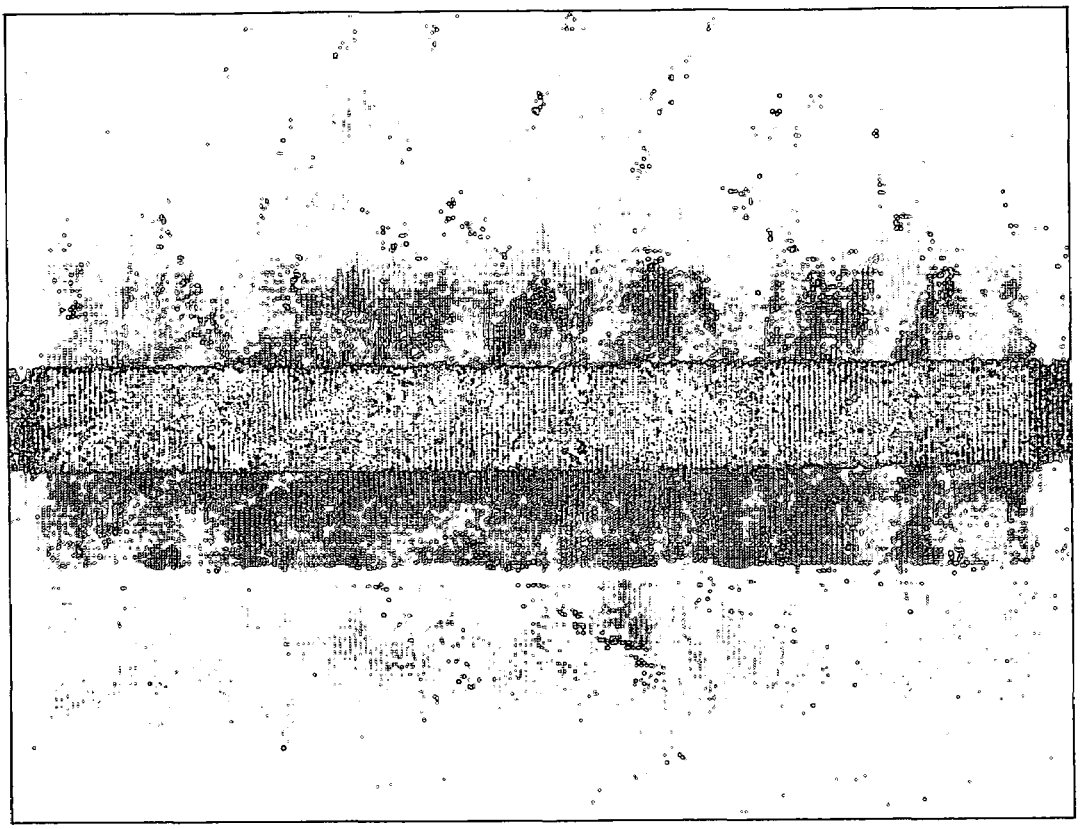

FIG. 1 graphically shows the temperature dependence of capacitances and losses of a disk-shaped sample when use is made of a dielectric composition in accordance with the invention;

FIG. 2 shows a laminated component composed of two glass ceramic layers Hereus AHT01-004 and a central layer of a dielectric composition in accordance with the invention after sintering.

EXAMPLE 1

For the manufacture of the $BaTiO_3$—$Ba(Zn_{1/3}Nb_{2/3})O_3$ mixed crystal (base material) use is made of the following starting materials:

Ba: $BaCO_3$, ultrafine, $d_{50}$=0.16 μm (Solvay BM040, Massa, Italy)

Zn: $ZnCO_3$, pulverized, $d_{50}$<0.5 μm (Merck, Darmstadt)

Ti: Ti-tetrabutylate (TBT; $Ti[OC_3H_7]_4$, hydrolyzed in $H_2O$ to colloidal $TiO(OH)_2$; (Dynamit-Nobel, Troisdorf)

Nb: niobium oxalate, aqueous solution (H. C. Starek, Goslar)

The doping material manganese was used in the form of $Mn(NO_3)_2$ (Merck, Darmstadt).

The aim is to obtain a base material of the composition $Ba(Ti_{1-x-y}Mn_y[Zn_{1/3}Nb_{2/3}]_x)O_3$, where $0.03 \leq x \leq 0.1$ and $0.001 \leq x \leq 0.01$. The optimum values for x and y were found to be x=0.07 and y=0.003.

The starting components were intensively mixed in the appropriate molar quantities in an aqueous suspension in a ball mill. Subsequently the suspension was dried under a radiant heater and deaggregated in a ball mill so as to obtain a loose powder. Said powder was then calcined for 12 hours at approximately 1000° C. in air. X-ray diffractometric recordings show a cubic perovskite phase with small quantities of a carbonatic ($BaCO_3$) secondary phase. The calcined base material was reduced in size in a ball mill to a particle size of $d_{50} \approx 0.3$–0.4 μm. The specific surface area of the ground powder was approximately 5–6 m²/g, corresponding to a crystallite size $d_{10}$ of 0.2 μm or less.

EXAMPLE 2

To manufacture the sintering additives use was made of starting materials in commercially available form, such as $B_2O_3$, ZnO, CuO, $Li_2CO_3$ (Merck, Darmstadt), $TiO_2$ (TM-3, Fuji Titanium, Japan), $SiO_2$ (Erosil Ox-50, Degusa Hanau).

If the sintering additives should also include pre-reacted intermediate products, namely boralith, ZST and lithium silicate, then these pre-reacted intermediate products are prepared by mixing the appropriate starting materials in a ball mill after which they are calcined in air for two hours. The calcining temperature being approximately 940° C. for boralith, approximately 900° C. for ZST and approximately 800° C. for lithium silicate.

Mixtures as listed in the following Table 1 were prepared:

TABLE 1

| | Starting material | Percentage with respect to base material (wt. %) | Optimal (wt. %) |
|---|---|---|---|
| Mixture A | $Zn_4B_6O_{13}$ | 1 . . . 5 | 2 |
| | $SiO_2$ | 0.25 . . . 2.5 | 0.5 |
| | CuO | 0.25 . . . 1.5 | 0.5 |
| Mixture B | $Zn_4B_6O_{13}$ | 1 . . . 5 | 2 |
| | $ZnSiTiO_5$ | 1 . . . 5 | 2.7 |
| | CuO | 0.25 . . . 1.5 | 0.5 |
| | $Li_2SiO_3$ | 0.5 . . . 2.5 | 1 |

The sintering additives were ground to an average grain size $d_{50}$<0.5 μm.

Sinterable dielectric compositions were prepared by mixing the base material in a ball mill with the appropriate sintering additives referred to as mixture A and mixture B. For these compositions, in the temperature range of 20° C. to 900° C., the coefficient of expansion τ exhibits values of τ=10 . . . 11 ppm/K. Commercially available glass ceramics have a coefficient of expansion τ=9 . . . 11 ppm/K. The coefficients of expansion match surprisingly well, so that sintering does not lead to stress cracking.

The dielectric and ceramic properties of the dielectric composition in accordance with the invention were tested in disk capacitors having a thickness of 600 μm and a diameter of 6 mm. For this purpose, the powdery dielectric compositions were compressed to disk-shaped green bodies at a pressure of 10 KN and subsequently isothermally sintered for two hours in air at 900° C., 920° C. and 940° C. at a heating and cooling rate of 300 K/h. For the electrodes use was made of vapor deposited CrNi/Au layers. The to measurement of the dielectric properties in the range of −50° C. to +150° C. at an alternating voltage of 1 V and a frequency of 1 kHz showed a broad maximum of the dielectric constant at room temperature, with K being in the range of 2400–3400, dependent upon the sintering temperature of the samples. FIG. 1 shows the results at a sintering temperature of 900° C.

The properties of all samples are summarized in Table 2:

TABLE 2

| | Sintering temperature: 900° C. | Sintering temperature: 920° C. | Sintering temperature: 940° C. |
|---|---|---|---|
| Sintering additive mixture A | | | |
| Density g/cm³ | 5.72 | 5.76 | 5.81 |
| Dielectric constant K | 2510 | 2830 | 3380 |
| Tan δ | 0.006 | 0.005 | 0.005 |
| Sintering additive mixture B | | | |
| Density g/cm³ | 5.64 | 5.66 | 5.7 |
| Dielectric constant K | 2850 | 3230 | 4820 |
| Tan δ | 0.006 | 0.006 | 0.007 |

δ = loss angle

The composition of the mixed crystal used is $Ba(Ti_{0.927}Ml_{003}[Zn_{1/3}Nb_{2/3}]_{0.07})O_3$.

EXAMPLE 3

The finely ground base material with a selected sintering additive was used to prepare an aqueous binder emulsion on the basis of polyvinyl alcohol. By means of the "doctor blade" method the binder emulsion was poured out and formed into ceramic green foils having a thickness of 40 μm. These green foils were stacked between green foils of glass ceramic material (Heraeus type AHT 01-004) having a thickness of 100 μm and laminated by applying a low pressure of 300 bar at a temperature of 85° C. The green laminated body was heated at a rate of 60 K/h to a temperature of 450° C. at which the binder was burned out for 2 hours in air. Subsequently, the LTCC laminated bodies thus manufactured were heated at a heating rate of 120 K/h to maximum temperatures in the range of 900° C. to 940° C. and sintered in air for a half hour.

FIG. 2 is a microscopic sectional view of a fracture-free monolithic laminated component wherein the layers adhere well to one another and hardly show signs of interreaction.

The method in accordance with the invention enables a laminated component with electrodes of pure silver to be sintered in a fracture-free manner at suitable temperatures in the range of 900° C. to 920° C. If the process requires higher temperatures, for example 940° C., then Ag/Pd-98/2 electrodes can be produced in a fracture-free manner.

The invention thus enables passive circuit elements such as filters, high-pass and low-pass filters and circuits for adapting impedance to be implemented in a laminated structure, the passive electronic components that are integrated including not only capacitors but also coils and other components.

What is claimed is:

1. A dielectric composition on the basis of barium titanate ($BaTiO_3$) that is present with $Ba(Zn_{1/3}Nb_{2/3})O_3$ in a perovskite structure, characterized in that said dielectric composition exhibits an average grain size $d_{50}$ in the range of 0.2 μm to 0.5 μm and a crystallite size $d_{10}$ below 0.3 μm.

2. A dielectric composition as claimed in claim 1, characterized in that said dielectric composition exhibits an average grain size $d_{50}$ in the range of 0.3 μm to 0.4 μm, and a crystallite size $d_{10}$ below or equal to 0.2 μm.

3. A dielectric composition as claimed in claim 1, characterized in that said dielectric composition comprises zinc oxide (ZnO), boron oxide ($B_2O_3$), silicon oxide ($SiO_2$) and copper oxide (CuO).

4. A dielectric composition as claimed in claim 3, characterized in that it comprises copper oxide in a content of 0.25 wt. % to 1.5 wt. % with respect to the quantity of $BaTiO_3$—$Ba(Zn_{1/3}Nb_{2/3})O_3$ mixed crystal.

5. A dielectric composition as claimed in claim 3, characterized in that it comprises zinc oxide and boron oxide as boralite ($Zn_4B_6O_{13}$).

6. A dielectric composition as claimed in claim 5, characterized in that it comprises boralith in a quantity of 1 wt. % to 5 wt. % with respect to the quantity of $BaTiO_3$—$Ba(Zn_{1/3}Nb_{2/3})O_3$ mixed crystal.

7. A dielectric composition as claimed in claim 3, characterized in that it comprises titanium oxide ($TiO_2$) and lithium carbonate ($Li_2CO_3$).

8. A dielectric composition as claimed in claim 6, characterized in that lithium carbonate and silicon oxide are pre-reacted to lithium silicate ($Li_2SiO_3$).

9. A dielectric composition as claimed in claim 8, characterized in that it comprises lithium silicate in a quantity of 0.5 wt. % to 2.5 wt. % with respect to the quantity of $BaTiO_3$—$Ba(Zn_{1/3}Nb_{2/3})O_3$ mixed crystal.

10. A dielectric composition as claimed in claim 6, characterized in that zinc oxide, silicon oxide and titanium oxide are pre-reacted to ZST ($ZnSiTiO_5$).

11. A dielectric composition as claimed in claim 10, characterized in that it comprises ZST in a quantity of 1 wt. % to 5 wt. % with respect to the quantity of $BaTiO_3$—$Ba(Zn_{1/3}Nb_{2/3})O_3$ mixed crystal.

12. A dielectric composition as claimed in claim 1, characterized in that manganese (Mn) has been added to said dielectric composition to form $Ba(Ti_{1-x-y}Mn_y[Zn_{1/3}Nb_{2/3}]_x)O_3$, where $0.03 \leq x \leq 0.1$ and $0.001 \leq y \leq 0.01$.

13. A method of manufacturing a $BaTiO_3$—$Ba(Zn_{1/3}Nb_{2/3})O_3$ mixed crystal for a dielectric composition as claimed in claim 1, comprising the following steps:

providing starting materials for barium, zinc, titanium, niobium and, if necessary, manganese in pulverized form;

mixing the appropriate molar quantities of the starting materials in an aqueous suspension;

drying the suspension and deaggregating the dried mixture to a powder;

calcining the powder;

grinding the calcined powder to a grain size $d_{50}$ in the range of 0.2 μm to 0.5 μm so that the crystallite size $d_{10}$ is smaller than 0.3 μm.

14. A method of manufacturing a dielectric composition comprising the following steps:

providing a powder of $BaTiO_3$—$Ba(Zn_{1/3}Nb_{2/3})O_3$-mixed crystal, if necessary doped with manganese, having an average grain size $d_{50}$ in the range of 0.2 μm to 0.5 μm, preferably in the range of 0.3 μm to 0.4 μm, and a crystallite size $d_{10}$ below 0.3 μm, preferably below or equal to 0.2 μm;

providing a sintering additive having an average grain size $d_{50}$ below 0.5 μm, which is selected from:

a) a mixture of zinc oxide, boron oxide, silicon oxide and copper oxide, a1) a mixture of boralith, silicon oxide and copper oxide, b) a mixture of zinc oxide, boron oxide, silicon oxide, copper oxide, titanium oxide and lithium carbonate, or b1) a mixture of boralith, ZST, lithium silicate and copper oxide, in a quantity of 1.5 wt. % to 15 wt. % with respect to the quantity of $BaTiO_3$—$Ba(Zn_{1/3}Nb_{2/3})O_3$ mixed crystal;

mixing BaTiO3—$Ba(Zn_{1/3}Nb_{2/3})O_3$ mixed crystal with the selected sintering additive, making sure that the average grain size is maintained.

15. A sintered laminated component comprising at least two layers of a glass ceramic between which a dielectric composition as claimed in claim 1 is arranged, and comprising integrated electrodes of silver (Ag) or a silver-containing alloy.

* * * * *